US011825362B2

(12) United States Patent
Dhanda et al.

(10) Patent No.: US 11,825,362 B2
(45) Date of Patent: Nov. 21, 2023

(54) NEIGHBOR CELL MEASUREMENTS FOR NARROWBAND COMMUNICATIONS

(71) Applicant: QUALCOMM Incorporated, San Diego, CA (US)

(72) Inventors: Mungal Singh Dhanda, Slough (GB); Ayan Sengupta, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 17/214,277

(22) Filed: Mar. 26, 2021

(65) Prior Publication Data

US 2022/0312284 A1 Sep. 29, 2022

(51) Int. Cl.
*H04W 36/00* (2009.01)
*H04W 4/80* (2018.01)
*H04W 76/27* (2018.01)
*H04W 76/30* (2018.01)

(52) U.S. Cl.
CPC ....... *H04W 36/00837* (2018.08); *H04W 4/80* (2018.02); *H04W 36/0058* (2018.08); *H04W 36/0085* (2018.08); *H04W 36/0088* (2013.01); *H04W 36/0094* (2013.01); *H04W 76/27* (2018.02); *H04W 76/30* (2018.02)

(58) Field of Classification Search
CPC ... H04W 36/0085; H04W 36/08; H04W 4/70; H04W 36/30; H04W 36/00; H04W 36/0088; H04W 24/10; H04W 36/0058; H04W 36/0061; H04W 36/0083; H04W 36/0094
See application file for complete search history.

(56) References Cited

U.S. PATENT DOCUMENTS

2017/0026863 A1\* 1/2017 Wang ................. H04W 4/70
2022/0322193 A1\* 10/2022 Tao .................. H04W 36/0058

FOREIGN PATENT DOCUMENTS

EP 4009692 A1 \* 6/2022

\* cited by examiner

*Primary Examiner* — Nam T Huynh
(74) *Attorney, Agent, or Firm* — Patterson + Sheridan, LLP

(57) ABSTRACT

Certain aspects of the present disclosure provide techniques for neighbor cell measurements for narrowband communications. An example method generally includes detecting a trigger to take neighbor cell measurements while a user equipment is in a radio resource control (RRC) connected state with a serving cell, based at least in part on a threshold applied to a channel condition metric measured for the serving cell and one or more additional conditions. The method also includes taking neighbor cell measurements in response to detecting the trigger.

30 Claims, 10 Drawing Sheets

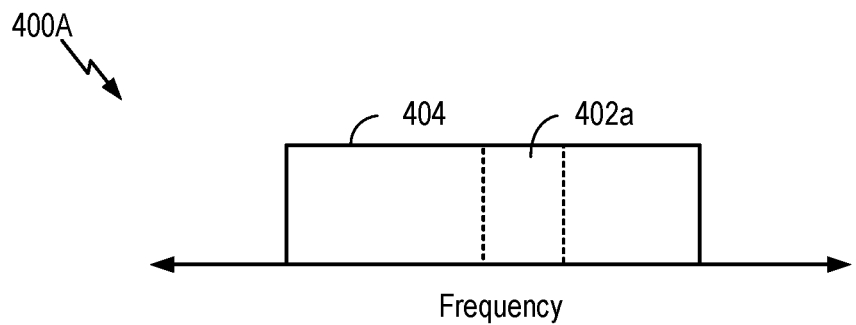
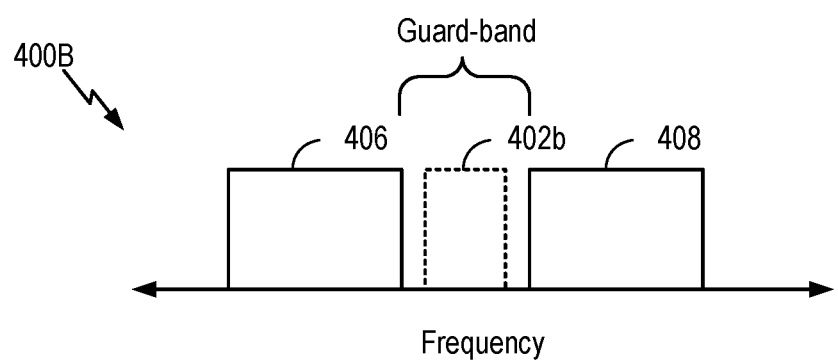
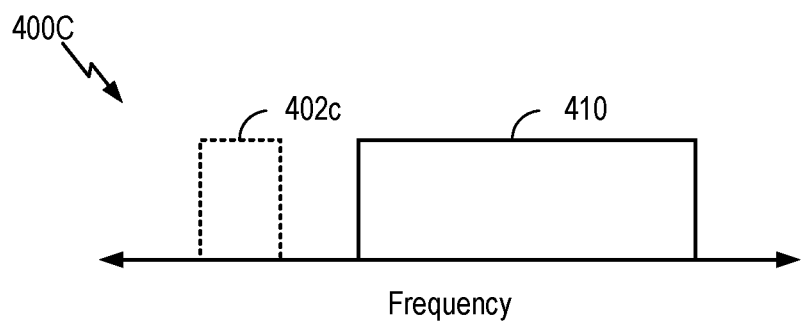
FIG. 4

NEIGHBOR CELL MEASUREMENTS FOR NARROWBAND COMMUNICATIONS

INTRODUCTION

Aspects of the present disclosure relate to wireless communications, and more particularly, to techniques for triggering neighbor cell measurements.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a user equipment (UE). The method generally includes detecting a trigger to take neighbor cell measurements while the UE is in a radio resource control (RRC) connected state with a serving cell, based at least in part on a threshold applied to a channel condition metric measured for the serving cell and one or more additional conditions. The method also includes taking neighbor cell measurements in response to detecting the trigger.

One aspect provides a method for wireless communication by a network entity. The method generally includes configuring a UE with one or more thresholds for one or more additional conditions that trigger the UE to take neighbor cell measurements while the UE is in an RRC connected state with the network entity based at least in part on a threshold applied to a channel condition metric measured for the network entity and the one or more additional conditions. The method further includes communicating with the UE via a narrowband (NB) carrier.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 4 depicts example frequency deployments for a narrowband carrier.

DETAILED DESCRIPTION

Aspects of the present disclosure provide apparatuses, methods, processing systems, and computer-readable mediums for detecting when to take neighbor cell measurements at a narrowband internet-of-things (NB-IoT) device in a connected state.

In NB-IoT, neighbor cell measurements in a connected state are typically not supported. Even if neighbor cell measurements in a connected state were supported for NB-IoT, neighbor cell measurements could consume too much power in a connected state if the measurements are too frequent. Power consumption is especially important for NB-IoT devices, which are designed for low power consumption and extremely long battery life, such as 10 years. Moreover, NB-IoT devices have very low data rates compared to LTE, e.g., NB-IoT peak data rate is around 68 kbps for downlink and around 132 kbps for uplink while actual data rate can be significantly lower than this, especially in extended coverage. Interrupting the connected state communications for neighbor cell measurements may reduce the already low throughput available to NB-IoT devices.

Aspects of the present disclosure provide certain trigger(s) for detecting when to take neighbor cell measurements at a NB-IoT device in a connected state to minimize the interruption and consume as little power as possible. In general, the UE may be configured to only trigger neighbor cell measurements if the UE considers the serving cell will become too poor to complete a data transfer in the connected state. As an example, the trigger for taking neighbor cell measurements may be based on a channel condition metric (e.g., Srxlev) and one or more additional conditions, such as a condition based on how much data is left for transmission or reception in the connected state. Another additional condition may consider a rate of change in the channel condition between the NB-IoT device and a base station.

The trigger for taking neighbor cell measurements may initiate the measurements infrequently to reduce the amount of power consumption used at a NB-IoT. The triggers for taking neighbor cell measurements may facilitate a reduced interruption time, such as reducing the time between 508 and 510 as further described herein with respect to FIG. 5, due to radio link failure. The reduced interruption time may enable a desirable time to re-establish a connection with a neighbor cell, which may provide desirable throughput and/or latency for NB-IoT communication.

Introduction to Wireless Communication Networks

Figure 1:
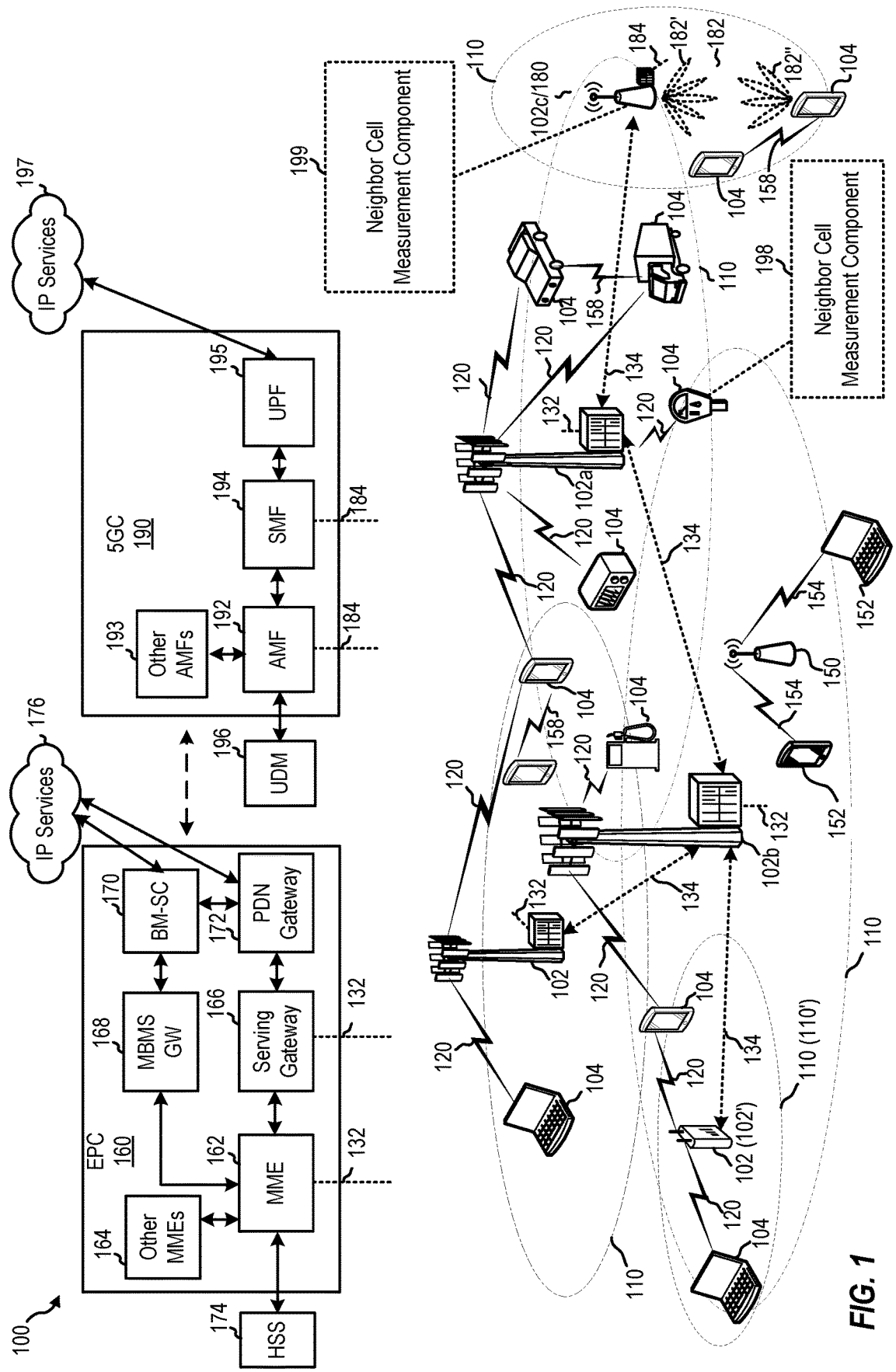
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks such as an Evolved Packet Core (EPC) 160, and 5G Core (5GC) 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB, an access point, a base transceiver station, a radio base station, a radio transceiver, or a transceiver function, or a transmit reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes neighbor cell measurement component 199, which may configure a trigger for taking neighbor cell measurements at a UE (such as an NB-IoT device). Wireless network 100 further includes a neighbor cell measurement component 198, which may trigger the UE 104 to take neighbor cell measurements as further described herein.

Figure 2:
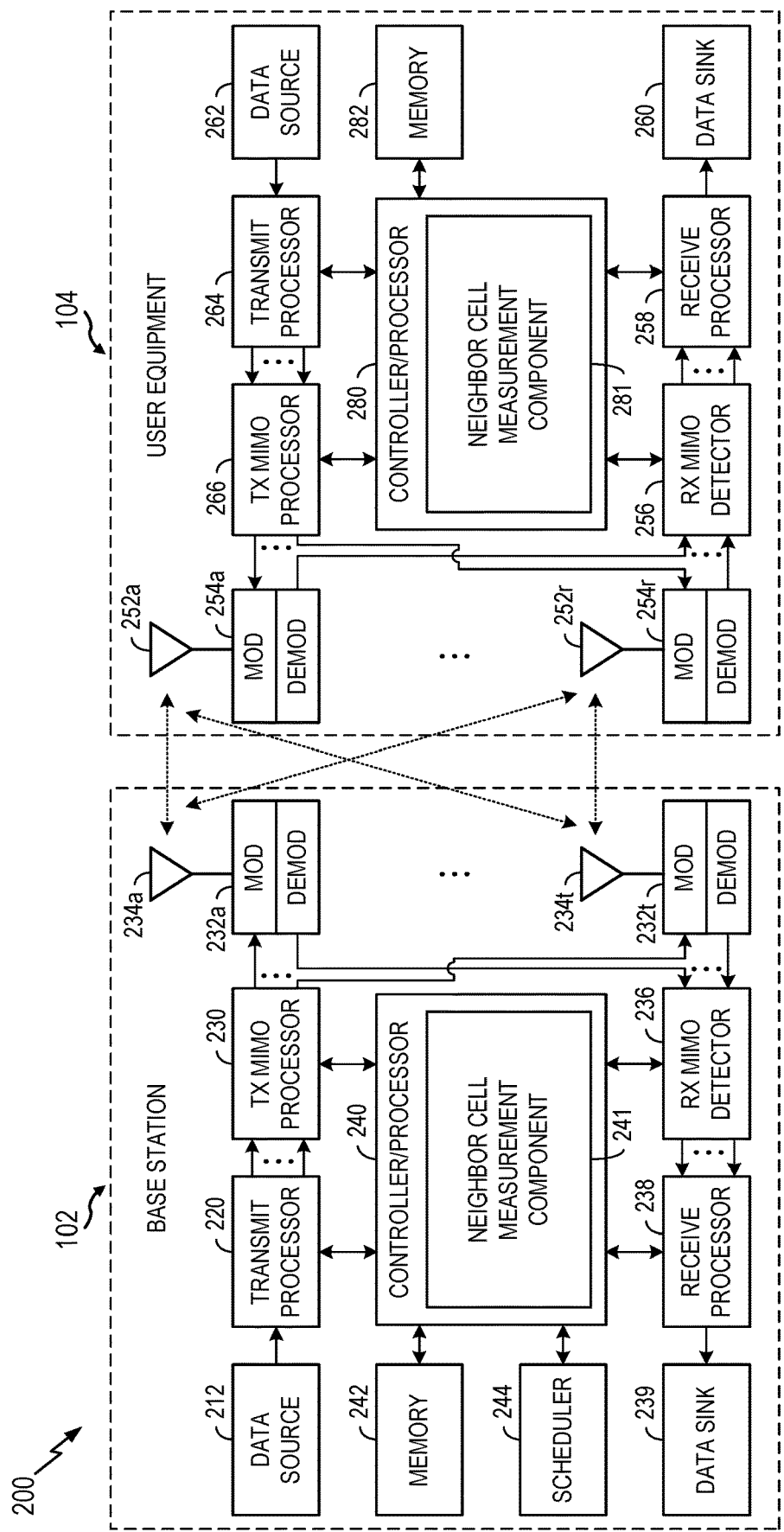
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes a neighbor cell measurement component 241, which may be representative of the neighbor cell measurement component 199 of FIG. 1. Notably, while depicted as an aspect of controller/processor 240, the neighbor cell measurement component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

User equipment 102 includes controller/processor 280, which may be configured to implement various functions related to wireless communications. In the depicted example, controller/processor 280 includes a neighbor cell measurement component 281, which may be representative of the neighbor cell measurement component 198 of FIG. 1. Notably, while depicted as an aspect of controller/processor 280, the neighbor cell measurement component 281 may be implemented additionally or alternatively in various other aspects of user equipment 104 in other implementations.

Figure 3:
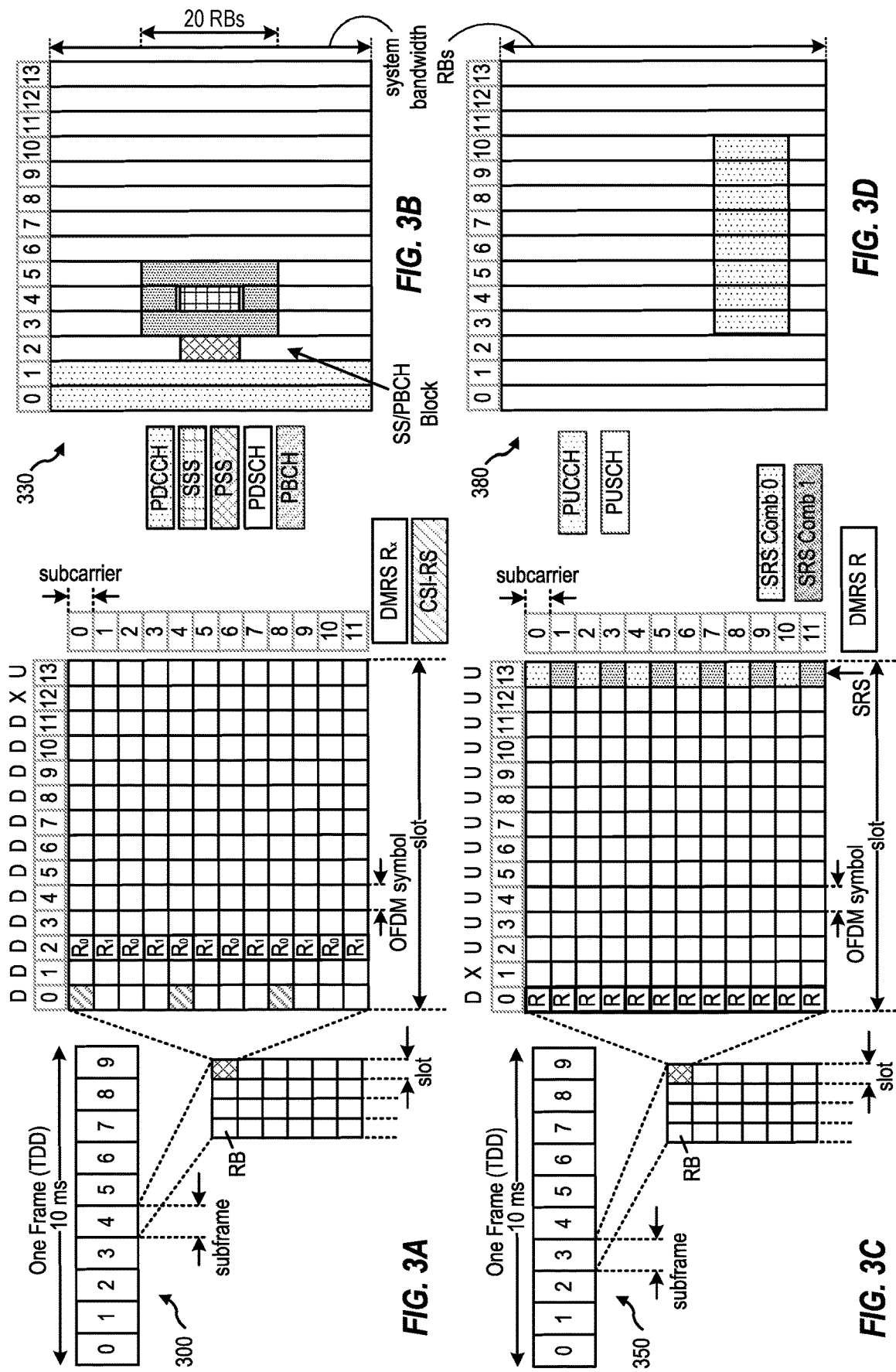
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to NB-IoT Communications

Certain wireless communication systems (e.g., Evolved Universal Terrestrial Radio Access (E-UTRA) system and/or NR system) may enable access to network services using a physical layer configured for very low power consumption and low complexity, which may be beneficial for Internet-of-Things (IoT) devices operating on battery power. These low power network services may be referred to as narrowband IoT (NB-IoT) operations. Under NB-IoT operations, a UE may support data rates up to 68 kbps for downlink and up to 132 kbps for uplink, for example, via a full carrier bandwidth of 180-200 kHz and a subcarrier spacing of 3.75 kHz or 15 kHz. At such a low bandwidth, the NB-IoT may support a low complexity transceiver to enable a low cost solution for IoT devices. In certain cases, a UE may be equipped with only a single antenna to facilitate low power consumption. The low power consumption may enable an NB-IoT device to operate for at least 10 years on battery power. Those of skill in the art will understand that the parameters for configuring NB-IoT operations are exemplary only. Additional parameters or categories of parameters may be used in addition to or instead of those described.

FIG. 4 are frequency diagrams illustrating various frequency deployments 400A-400C for a NB-IoT carrier. In certain cases, NB-IoT operations may be deployed in-band. For example, the frequency deployment 400A depicts a narrowband carrier 402a positioned within a wider system bandwidth 404 (e.g., an E-UTRA or NR system bandwidth) and/or another carrier in the frequency domain. In certain aspects, the narrowband carrier 402a may span one resource block (RB) within the wider system bandwidth 404. In this case, the 180 kHz bandwidth for the RB may be aligned (or overlap) with a RB of the system bandwidth 404.

In certain cases, NB-IoT operations may be deployed in a guard-band. For example, the frequency deployment 400B depicts the narrowband carrier 402b positioned within a guard-band between bands 406, 408, which may be E-UTRA or NR bands. In this deployment, the 180 kHz RB within the guard band may be aligned with a 15 kHz tone grid of wideband LTE, for example, in order to use the same Fast Fourier Transform (FFT) and/or reduce interference from in-band LTE communications.

In certain cases, NB-IoT operations may be deployed as a standalone service in the frequency domain. The frequency deployment 400C depicts the narrowband carrier 402c positioned outside the wider system bandwidth 410 in the frequency domain. For example, the narrowband carrier 402c may be positioned outside of the carriers supported for E-UTRA and NR, such that the narrowband carrier 402c is in a band separate from E-UTRA and NR, such as a band for Universal Terrestrial Radio Access (UTRA) or Global System for Mobile Communications (GSM).

For certain devices (such as non-NB-IoT devices), idle mode neighbor cell measurements may be triggered when one of the following conditions are fulfilled: for intra frequency measurements, when the receive level value in dB (Srxlev) for the serving cell is less than or equal to an intra-frequency receive power threshold ($S_{IntraSearchP}$) or when the quality value in dB (Squal) for the serving cell is less than or equal to an intra-frequency receive quality threshold ($S_{IntraSearchQ}$); for inter frequency measurements with a serving frequency priority higher than the neighbor cell frequency priority, when the receive level value in dB (Srxlev) for the serving cell is less than or equal to the intra-frequency receive power threshold ($S_{IntraSearchP}$) or when the quality value in dB (Squal) for the serving cell is less than or equal to the intra-frequency receive quality threshold ($S_{IntraSearchQ}$); and for inter-frequency measurements with the serving frequency priority less than or equal to the neighbor cell frequency priority, when the receive level value in dB (Srxlev) for the serving cell is less than or equal to an inter-frequency receive power threshold ($S_{nonIntraSearchP}$) and when the quality value in dB (Squal) for the serving cell is less than or equal to an inter-frequency receive quality threshold ($S_{nonIntraSearchQ}$). As used herein, a non-NB-IoT device may refer to a wireless communication device that supports one or more carriers having a bandwidth wider than 200 kHz, such as up to 20 MHz for EUTRA, up to 100 MHz in FR1 for NR, and/or up to 400 MHz in FR2 for NR of carrier bandwidth.

In NB-IoT, frequency priorities may not be supported. In NB-IoT, idle mode neighbor cell measurements are triggered when one of the following conditions are fulfilled: for intra-frequency measurements, when the receive level value in dB (Srxlev) for the serving cell is less than or equal to the intra-frequency receive power threshold ($S_{IntraSearchP}$); and for inter-frequency measurements, when the receive level value in dB (Srxlev) for the serving cell is less than or equal to the inter-frequency receive power threshold ($S_{nonIntraSearchP}$). In NB-IoT, the receive level value (Srxlev) may be determined according to the following expression:

$$\text{Srxlev} = Q_{rxlevmeas} - Q_{rxlevmin} - P_{compensation} - Q\text{offset}_{temp}$$

where $Q_{rxlevmeas}$ is the measured cell receive level value (RSRP); $Q_{rxlevmin}$ is the minimum required receive level in the cell (dBm); $P_{compensation}$ is a compensation factor, which may depend on a maximum TX power level a UE may use when transmitting on the uplink in the cell (dBm) and a maximum RF output power of the UE (dBm) according to the UE power class; and $Q\text{offset}_{temp}$ is an offset that may be temporarily applied to a cell, which may be configured by the network.

In NB-IoT, neighbor cell measurements and reporting in a Radio Resource Control (RRC) connected state (e.g., RRC CONNECTED state) are not supported. In NB-IoT, the network does not configure neighbor cell measurements in a connected state. As used herein, neighbor cell measurements may include cell detection by identifying the synchronisation signal (e.g., primary synchronization signal (PSS), secondary synchronization signal (SSS) in LTE and NR, and narrowband PSS (NPSS) and narrowband SSS (NSSS) in NB-IoT), and/or re-reading the synchronisation signal, and/or measuring a receive power (e.g., reference signal received power (RSRP) or narrowband RSRP (NRSRP)) and/or a channel quality (e.g., reference signal received quality (RSRQ) or narrowband RSRQ (NRSRQ)).

Because neighbor cell measurements are not done in a connected state in NB-IoT, when a channel (such as a dedicated downlink channel) becomes poor to maintain communication with the network, the UE may declare radio link failure and return to an RRC idle state (e.g., RRC_IDLE) to find a suitable cell to camp on and re-establish the RRC connection. Performing cell search entirely in idle mode (i.e., RRC idle state) takes time as the UE will perform cell detection, take measurements to identify the best beam (e.g., SSB) to decode system information, and then read the system information. Such a process in idle mode may lead to a disruption in data transfer, resulting in a lower data rate and higher latency.

Figure 5:
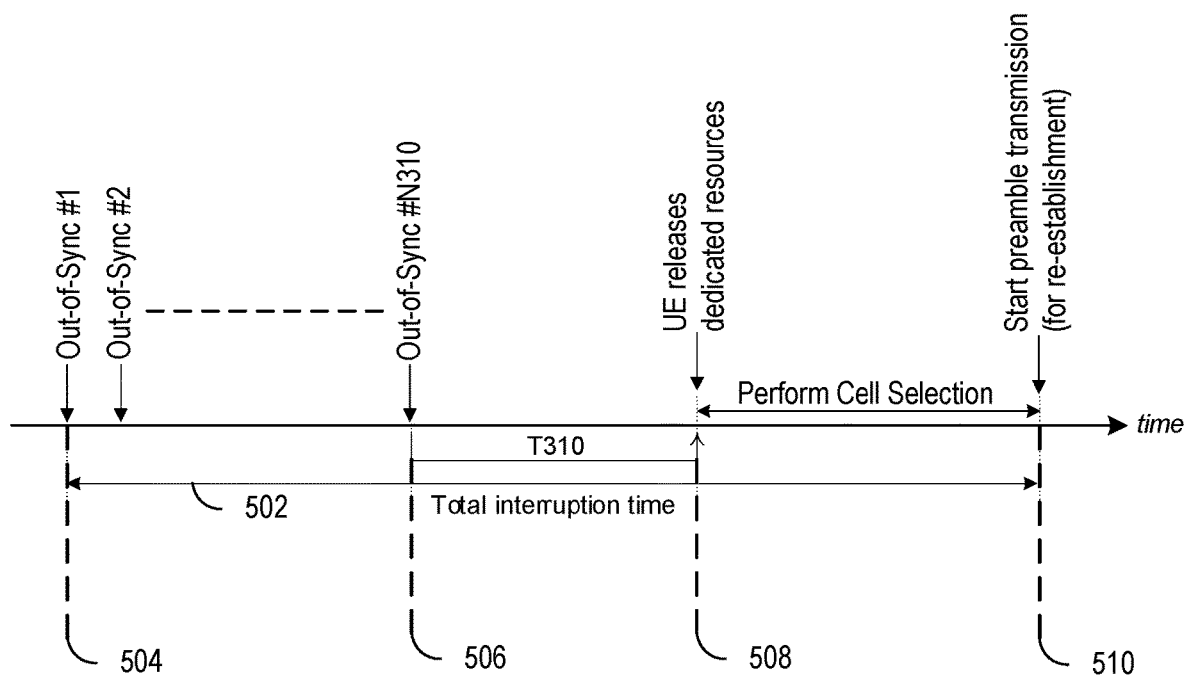
FIG. 5 depicts a timing diagram of an example interruption time encountered by a narrowband internet-of-things (NB-IoT) device due to a radio link failure in connected mode.

FIG. 5 is a timing diagram illustrating the interruption time 502 encountered by an NB-IoT device due to detecting radio link failure in connected mode. Between 504 and 508 the UE may experience reduced or no data throughput, and between 508 and 510 the UE experiences no data throughput. At 504, the NB-IoT device may detect an out-of-sync indication, and after a certain number of consecutive out-of-sync indications, the NB-IoT device may start a timer (T310) at 506. An out-of-sync indication generally means a downlink channel condition is below a certain threshold (such as a data error rate threshold and/or received power threshold), and the out-of-sync indication does not necessarily mean the UE is unable to receive downlink data. If the NB-IoT device fails to receive a certain number of in-sync indications before the timer expires, the NB-IoT device may declare radio link failure at 508. The NB-IoT device may release its connection with the serving cell, returning to an idle mode state, and perform cell selection. At 510, after performing the cell selection (cell synchronization, cell measurements, and decoding system information), the NB-IoT device may request to re-establish a connection with a neighbor cell, for example, via random access channel (RACH) preamble request.

To minimise disruption to data transfer, the NB-IoT device may identify a suitable neighbor cell while the NB-IoT device is in a connected state so that when NB-IoT device declares radio link failure the NB-IoT device can quickly complete cell selection and re-establish an RRC connection with a neighbor cell. For example, if the UE already has a suitable candidate neighbor cell at 508, the duration between 508 and 510 can reduced. In NB-IoT, power consumption is of paramount importance as well as to minimise disruption to data transfer due to the already low throughput available for NB-IoT communications and the low complexity transceiver. Neighbor cell measurements during a connected state may consume too much power and/or interrupt existing data transfers for narrowband communications. Accordingly, what is needed are techniques and apparatus for facilitating neighbor cell measurements in a connected state without consuming too much power and interrupting data transfers at a NB-IoT device.

Aspects Related to Neighbor Cell Measurements for Narrowband Communications

Aspects of the present disclosure provide certain trigger(s) for when to take neighbor cell measurements at a NB-IoT in a connected state. In general, the UE may only trigger neighbor cell measurements if the UE considers the serving cell will become too poor to complete a data transfer in the connected state. As an example, the trigger for taking neighbor cell measurements may be based on a channel condition metric (e.g., Srxlev) and one or more additional conditions, such as a condition based on how much data is left for transmission or reception in the connected state. Another additional condition may consider a rate of change in the channel condition between the NB-IoT device and the base station. The triggers for taking neighbor cell measurements may facilitate a reduced interruption time, such as reducing the time between 508 and 510 as depicted in FIG. 5, in communications due to radio link failure. The reduced interruption time may enable a desirable time to re-establish a connection with a neighbor cell, which may provide desirable throughput and/or latency for NB-IoT communications.

Unlike in non-NB-IoT devices, there will be no measurement gaps configured to allow the NB-IoT device to perform measurements on neighbor cells where the receiver is re-tuned to a different frequency than the frequency used for the downlink dedicated channel(s). Configuring such gaps will introduce interruptions to data transfer, and this then goes against the objective to minimise interruption to the low throughput. Performing intra- or inter-frequency measurements may use additional processing power impacting the power consumption, and the triggers for detecting when to take neighbor cell measurements described herein may restrain when to take neighbor cell measurements so as to not consume too much power in cell reselection.

One trigger for neighbor cell measurements in connected state is merely considering the condition of the serving cell (such as NRSRP and/or NRSRQ). But a disadvantage with this is that the UE may start to perform neighbor cell measurements and then data transfer completes and the connected state is released normally. The neighbor cell measurements performed in the connected state could end up being wasted, which will also waste the battery life of an NB-IoT. The triggers for taking neighbor cell measurements described herein may be configured to avoid wasting neighbor cell measurements during connected mode as further described herein.

Figure 6:
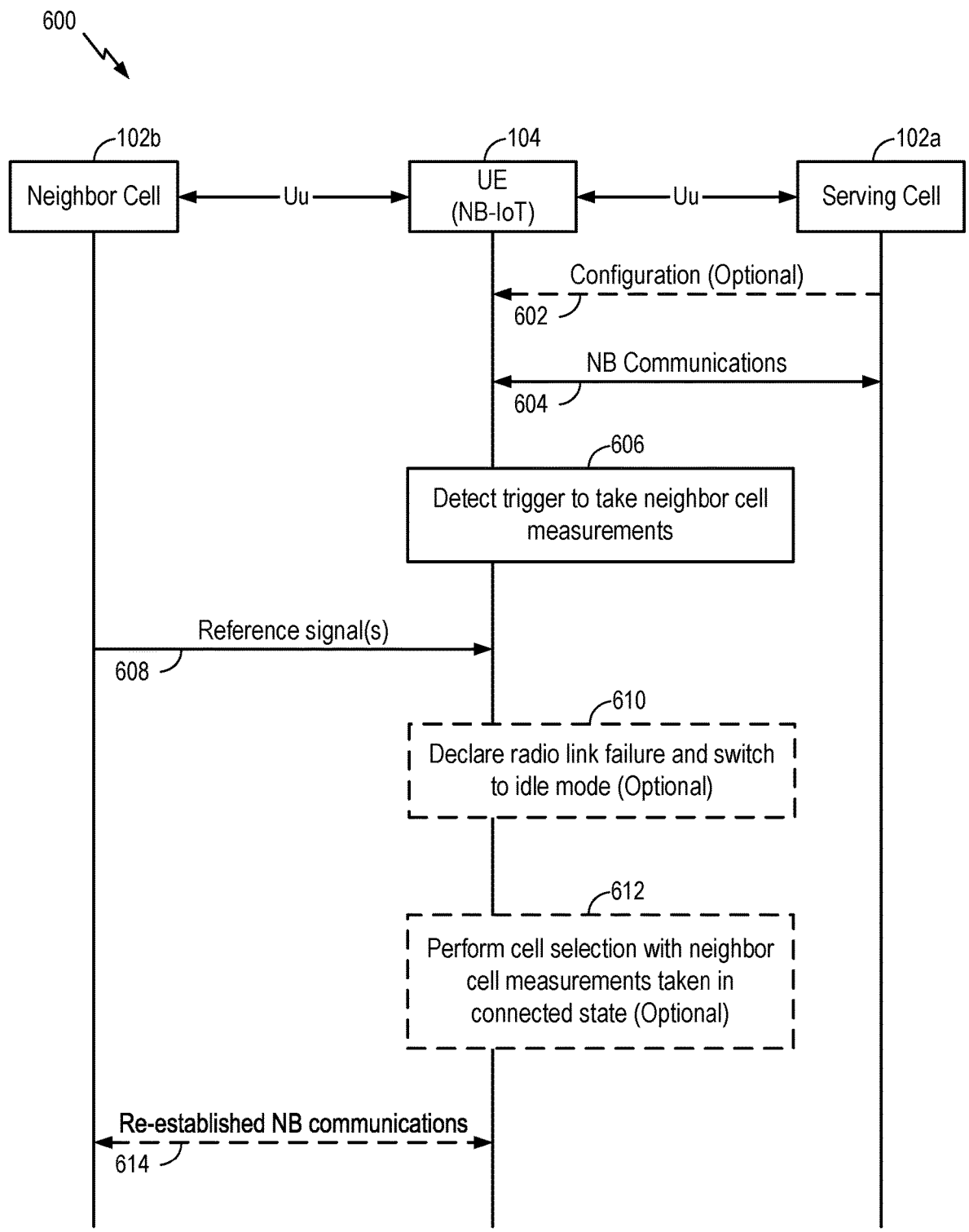
FIG. 6 depicts an example signaling flow for taking neighbor cell measurements in a connected state.

FIG. 6 depicts an example signaling flow 600 for taking neighbor cell measurements in a connected state. The flow may optionally begin at step 602, where the serving cell 102*a* may configure conditions for detecting the trigger to take neighbor cell measurements at the UE 104. For example, the serving cell 102*a* may provide specific thresholds for the conditions used to detect the trigger as further described herein.

At step 604, the UE 104 may be communicating with the serving cell 102*a* in a connected state, for example, via a narrowband carrier. The UE 104 may be transmitting data to and/or receiving data from the serving cell 102*a* at step 604.

At step 606, the UE 104 may detect the trigger to take neighbor cell measurements in the connected state, for example, as further described herein with respect to the method 700. In certain aspects, the conditions implemented for triggering the neighbor cell measurements may avoid or mitigate taking neighbor cell measurements that are not used for cell selection. As an example, the UE 104 may detect that a receive level value (Srxlev) associated with the serving cell 102*a* is less than or equal to a threshold (e.g., a value for $S_{IntraSearchP}$) and the remaining time for transmitting or receiving data in the connected state is greater than or equal to another threshold (e.g., 5 seconds).

At step 608, the UE 104 may take the neighbor cell measurements while in the connected state with the serving cell 102*a* in response to the trigger detected at step 606. As an example, the UE 104 may search for reference signals (e.g., NPSS and/or NSSS) from the neighbor cell 102*b* and measure the NRSRP and/or NRSRQ for the reference signals. The UE 104 may store these measurements in a computer-readable medium (e.g., memory) for use in cell selection as described herein.

At step 610, the UE 104 may detect a radio link failure with the serving cell 102*a*, for example, as described herein with respect to FIG. 5. The UE 104 may detect certain number of consecutive out-of-sync indications with the serving cell 102*a*, and after expiration of a timer (e.g., T310), the UE 104 may declare radio link failure with the serving cell 102*a*. In response to the radio link failure, the UE 104 may switch to idle mode.

At step 612, the UE 104 may perform cell selection with the neighbor cell measurements taken in the connected state at 608. For example, the UE 104 may select the neighbor cell 102b for communications based on the neighbor cell measurements, and the UE 104 may request to re-establish a connection with the neighbor cell 102b via a RACH procedure.

At step 614, the UE 104 may communicate with the neighbor cell 102b in a connected state. With the neighbor cell measurements taken before radio link failure is detected at step 610, the UE 104 may be able to quickly re-establish a connection with a neighbor cell, which may provide a desirable data rate and/or latency in re-establishing communications with the network.

Thus, FIG. 6 depicts an example of taking neighbor cell measurements in a connected state. In this example, cells 102a, 102b may wirelessly communicate with the UE 104 (e.g., via a Uu interface) in order to facilitate the connected state neighbor cell measurements. Note that while FIG. 6 is described herein with respect to there being a single neighbor cell, in certain cases, the UE may take neighbor cell measurements from multiple neighbor cells.

Example Methods of Neighbor Cell Measurements for Narrowband Communications

Figure 7:
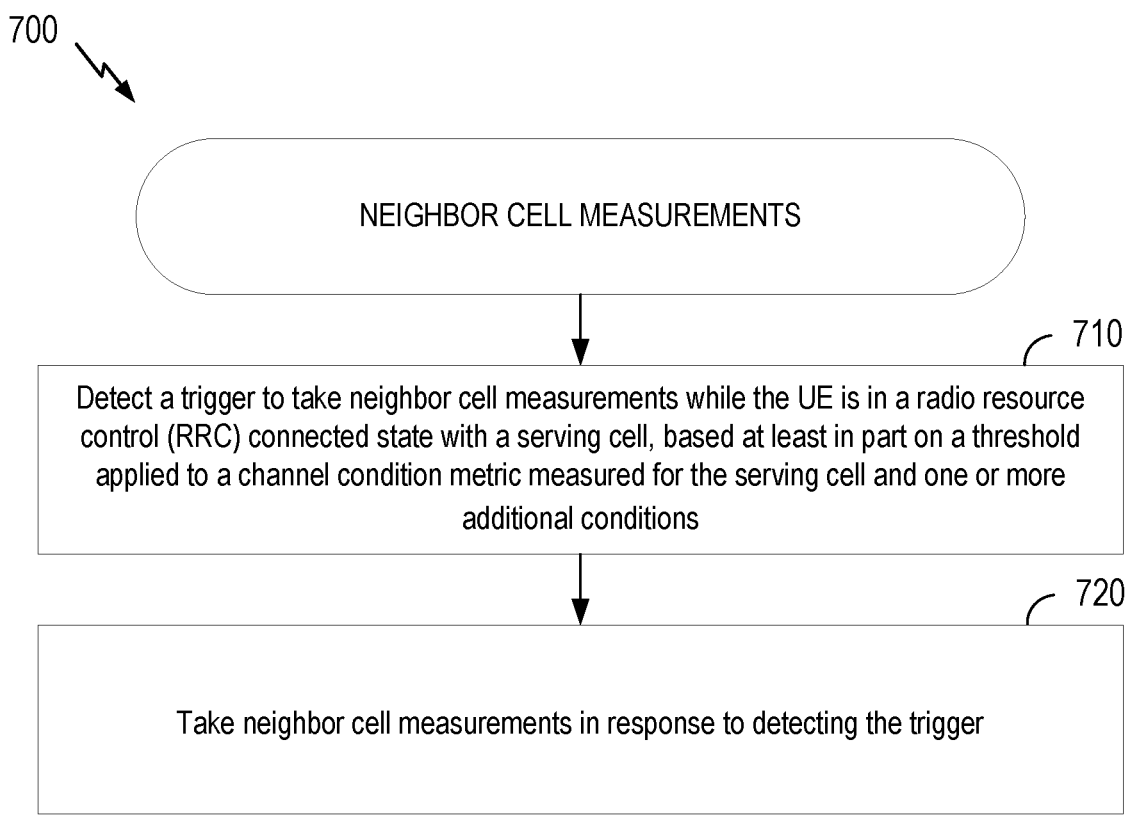
FIG. 7 depicts an example method for taking neighbor cell measurements at a user equipment in a connected state for narrowband communications

FIG. 7 depicts an example method 700 for taking neighbor cell measurements at a user equipment in a connected state for narrowband communications.

The method 700 may begin, at step 702, where the UE may detect a trigger to take neighbor cell measurements while the UE is in an RRC connected state with a serving cell (e.g., the base station 102a of FIG. 1), based at least in part on a threshold applied to a channel condition metric (e.g., Srxlev) measured for the serving cell and one or more additional conditions. The channel condition metric may include a receive level value (Srxlev) associated with the serving cell, for example, as described herein. As an example, while the UE is transmitting data to the serving cell, the UE may detect the trigger to take the neighbor cell measurements. The trigger may be configured to avoid or minimize an occurrence where neighbor cell measurements in the connected state are wasted to preserve the battery life and/or power consumption of the UE. The UE may detect the trigger when the receive level value (Srxlev) is less than or equal to the threshold (e.g., $S_{IntraSearchP}$ or $S_{nonIntraSearchP}$) and when the one or more additional conditions are met. That is, detection of the trigger may include the UE detecting that the receive level value is less than or equal to the threshold and that the one or more additional conditions are fulfilled.

At step 704, the UE may take neighbor cell measurements in response to detecting the trigger. The UE may monitor for one or more reference signals (e.g., the NPSS and/or NSSS) from a neighbor cell (e.g., the base station 102b and/or base station 102c of FIG. 1) while the UE is in the connected state. The UE may search for intra-frequency and/or inter-frequency reference signals from the neighbor cell while in the connected state before the UE declares radio link failure, for example, as depicted in FIG. 5. As an example, when the trigger is detected at step 702, the UE may search for neighbor cells and take neighbor cell measurements before 508 as depicted in FIG. 5. Suppose, for example, the trigger is detected at step 702 when the UE begins to detect out-of-sync indications between 504 and 506. The UE may take measurements of the received reference signals (such as an NRSRP and/or NRSRQ) and store these measurements for use during cell selection, for example, between 508 and 510 as depicted in FIG. 5. Taking the neighbor cell measurements before radio link failure is detected at 508 may enable the UE to quickly re-establish a connection with one of the neighbor cells, which may provide a desirable data rate and/or latency.

For certain aspects, the trigger for taking neighbor cell measurements may be configured for NB-IoT communications to preserve battery life, reduce power consumption, and/or remain within the processing capabilities of a low complexity NB-IoT device. The method 700 may further include the UE communicating with the serving cell via a narrowband carrier (e.g., a NB-IoT carrier having a bandwidth up to 200 kHz) relative to a wider band carrier and/or system bandwidth, for example, as described herein with respect to FIG. 4. The UE may comprise an NB-IoT device configured to support narrowband communications, such as a single antenna, a low complexity transceiver configured for the narrowband, and low power consumption. The neighbor cell measurements may include narrowband (NB) measurements, such as NRSRP and/or NRSRQ measurements of the NPSS and/or NSSS.

In certain aspects, the trigger may consider the remaining volume or amount of data to transmit and/or receive. With respect to the method 700, the additional conditions may include a first condition associated with an estimated volume of data for the UE to transmit or receive. For certain aspects, the first condition may depend on a release assistance indication (RAI), which may be detected at the UE. The RAI may indicate that additional data is to be transmitted or received in the RRC connected state. For example, the RAI may be a MAC-CE sent from the UE to a base station, where the RAI may provide the serving base station with information whether subsequent downlink or uplink transmission is expected. The first condition is considered met when a release assistance indication indicates additional data to be transmitted or received in the RRC connected state. For example, when the UE detects that subsequent downlink or uplink transmission is expected for the purposes of informing the serving base station via the RAI through MAC signaling, the first condition may be considered to be met.

In certain aspects, the first condition may depend on the remaining amount of data to be transmitted or received. The first condition may be considered met when the remaining amount of the data to be transmitted or received is greater than or equal to a first threshold (e.g., 5 kilobytes (kbytes)). The amount of data to be transmitted may be in terms of a unit of computer information (such as bits or bytes), packets, data blocks, MAC PDUs, RLC blocks, etc. In certain cases, due to differing data rates on the downlink and uplink channels for NB-IoT, the first threshold may include a threshold for downlink data (e.g., 2 kbytes) and another threshold for uplink data (e.g., 4 kbytes). In other words, there may be separate data thresholds for a downlink transmission and an uplink transmission. As an example, suppose the UE has 20 kbytes of data to transmit to the base station, and the first threshold is set to 5 kbytes. When there is 10 kbytes left of the payload to transmit, the UE detects that the receive level value (Srxlev) is less than or equal to the threshold ($S_{IntraSearchP}$). Due to the remaining payload (10 kbytes) being greater than the first threshold (5 kbytes) and the degraded channel conditions as detected by the receive level value, the UE may begin taking neighbor cell measurements in response to detecting the trigger.

In aspects, the first condition may depend on the remaining amount of time to transmit or receive data. The first condition may be considered met when the remaining time for the data to be transmitted or received is greater than or equal to a second threshold (e.g., 30 seconds). The time for the data to be transmitted may be in terms of a unit of time (e.g., seconds) or a time domain resource unit (e.g., symbols, slots, NPDCCH periods, etc.). The second threshold may include a threshold for downlink data (e.g., 15 seconds) and another threshold for uplink data (e.g., 30 seconds). There may be separate time thresholds for a downlink transmission and an uplink transmission.

In certain aspects, the trigger may consider the rate in degradation of the channel conditions between the UE and the serving cell. With respect to the method 700, the additional conditions may include a second condition associated with a channel condition between the UE and the serving cell. The second condition may be considered met when a rate of change in the channel condition is greater than or equal to a third threshold (e.g., dBm). The rate of change in the channel condition may be a change in channel condition over time. For example, the rate of change in the channel condition may be the change in the NRSRP of the serving cell over a specific duration (e.g., two NPDCCH periods). The interval between two consecutive NPDCCH may be referred to as an NPDCCH period.

For certain aspects, the neighbor cell measurements may include at least one of intra-frequency neighbor cell measurements or inter-frequency neighbor cell measurements. In other words, the UE may take intra-frequency and/or inter-frequency neighbor cell measurements at step 704. In certain aspects, there may be separate channel condition thresholds for intra-frequency and/or inter-frequency neighbor cell measurements. For example, the threshold at step 702 may include a first threshold ($S_{IntraSearchP}$) for intra-frequency neighbor cell measurements and a second threshold ($S_{nonItraSearchP}$) for inter-frequency neighbor cell measurements. The first threshold may be the same or different from the second threshold. In aspects, there may be separate threshold(s) associated with the additional conditions for intra-frequency and/or inter-frequency neighbor cell measurements. For example, the first condition and/or second condition may have separate thresholds for intra-frequency neighbor cell measurements and for inter-frequency neighbor cell measurements.

In accordance with certain aspects, the network may configure the UE with the additional conditions. The UE may receive a configuration indicating one or more thresholds for the one or more additional conditions. The UE may receive the first threshold for the remaining amount of data, the second threshold for the remaining time, and/or the threshold for rate of change in channel conditions. In certain cases, the configuration may indicate the specific additional condition(s) enabled for detecting the trigger. For example, the UE may receive an indication that the first condition for the remaining time and the second condition are enabled for detecting the trigger. In certain cases, the UE may receive an indication that the first condition for the remaining amount of data is enabled for detecting the trigger.

For certain aspects, the additional conditions may have default threshold values supported by the UE. That is, the UE may be preconfigured with default threshold values and active additional conditions to detect the trigger without any configuration form the network.

Those of skill in the art will appreciate that any one or more of the additional conditions may be active for detecting the trigger. That is, the UE may consider the first and second conditions in detecting the trigger. As an example, the UE may consider the RAI and the rate of change in the channel conditions in detecting the trigger. In certain cases, the UE may consider the more than one of the first conditions in detecting the trigger. For example, the UE may consider the remaining amount of time and the remaining amount of data in detecting the trigger. While the additional conditions for triggering the neighbor cell measurements are described herein with respect to the remaining data to transmit or receive and/or the rate of change in channel conditions to facilitate understanding, aspects of the present disclosure may also be applied to other suitable conditions that facilitate efficient power consumption in triggering the neighbor cell measurements in a connected state.

Figure 8:
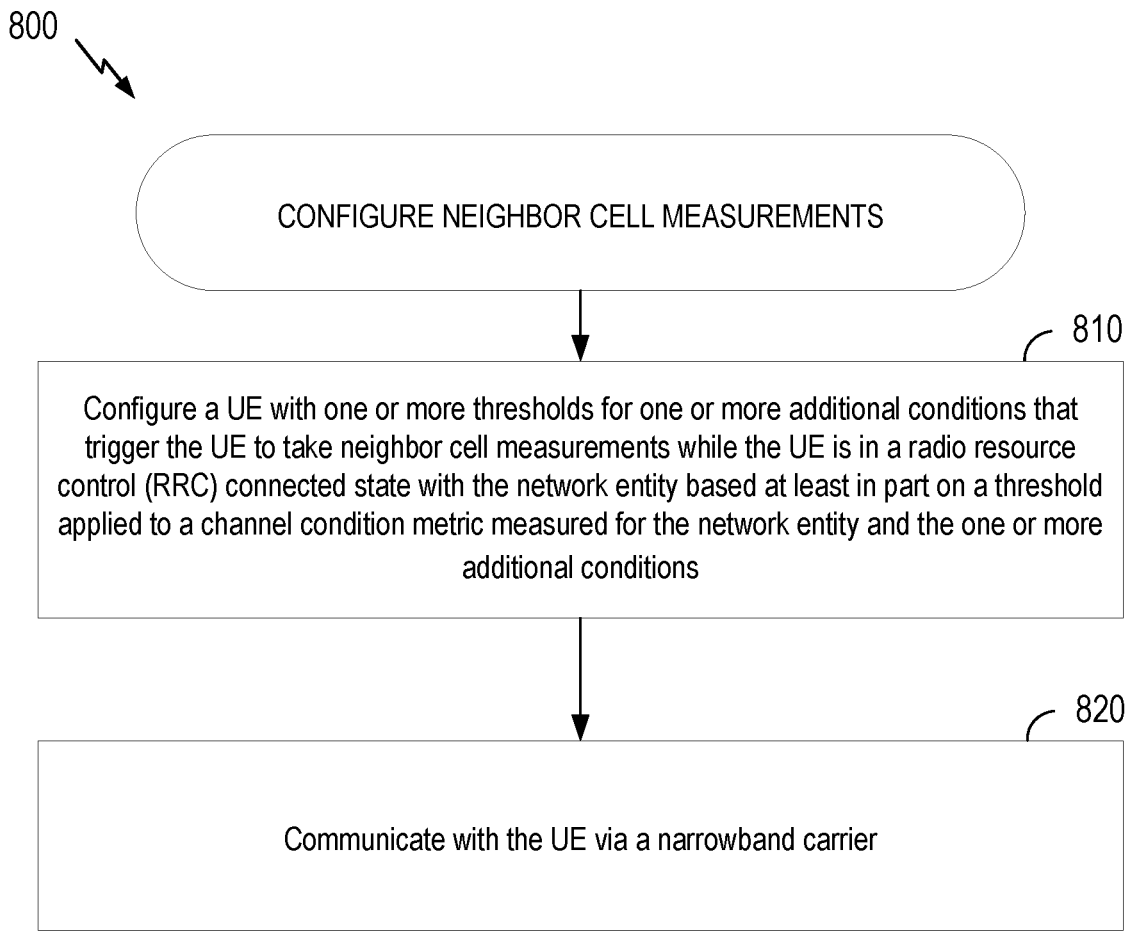
FIG. 8 depicts an example method for configuring a trigger for taking neighbor cell measurements at a user equipment in a connected state for narrowband communications.

FIG. 8 depicts an example method 800 for configuring a trigger for taking neighbor cell measurements at a user equipment in a connected state for narrowband communications.

The method 800 may begin, at step 802, where the network entity configure a UE with one or more thresholds for one or more additional conditions that trigger the UE to take neighbor cell measurements while the UE is in a RRC connected state with the network entity based at least in part on a threshold applied to a channel condition metric measured for the network entity and the one or more additional conditions. For example, the network entity may transmit a configuration (e.g., an RRC configuration) with the threshold for the additional conditions. In certain cases, the configuration may indicate specific conditions as being active and/or inactive for detecting the trigger.

At step 804, the network entity may communicate with the UE via a narrowband carrier. For example, the network entity may receive data from the UE on the narrowband carrier, such as the narrowband carriers depicted in FIG. 4. In other words, the UE may include a NB-IoT device, and the neighbor cell measurements may include NB measurements.

In aspects, the thresholds configured by the network entity may include the thresholds described herein with respect to the method 800. The thresholds may include a first threshold (e.g., 5 kbytes) associated with the remaining amount of data to be transmitted or received at the UE, a second threshold (e.g., 30 seconds) associated with the remaining time for data to be transmitted or received at the UE, and/or a third threshold (e.g., a certain value of dBm) associated with a rate of change in a channel condition between the UE and network entity.

For certain aspects, the neighbor cell measurements may include at least one of intra-frequency neighbor cell measurements or inter-frequency neighbor cell measurements. In aspects, the UE may be configured with separate thresholds for intra-frequency neighbor cell measurements or inter-frequency neighbor cell measurements. For example, the threshold may include a first threshold for intra-frequency neighbor cell measurements and a second threshold for inter-frequency neighbor cell measurements. In certain cases, the thresholds for the additional conditions may include one or more third thresholds for intra-frequency neighbor cell measurements and one or more fourth thresholds for inter-frequency neighbor cell measurements. The third thresholds may include a specific threshold value for the amount of data to be transmitted or received associated with intra-frequency neighbor cell measurements, for example. The fourth thresholds may include a specific threshold value for the amount of data to be transmitted or received associated with inter-frequency neighbor cell measurements.

In aspects, the network entity may adjust the thresholds for the additional conditions based on one or more factors or conditions. The network entity may adjust the thresholds based at least in part on the channel condition between the network entity and the UE, and the network entity may configure the UE with the adjusted thresholds. In certain aspects, the UE may be configured with the adjusted thresholds at step 802 or in response to a change in channel conditions. As an example, suppose the UE is encountering strong channel conditions (e.g., a strong NRSRP), the network entity may configure the UE with longer or larger thresholds that reflect the strong channel conditions, such as a threshold for the remaining time set to 10 seconds or a threshold for the remaining amount of data set to 10 kbytes. Where the UE is encountering poor channel conditions, the network entity may configure the UE with shorter or smaller thresholds, such as a threshold for the remaining time set to 5 seconds or a threshold for the remaining amount of data set to 5 kbytes.

Example Wireless Communication Devices

Figure 9:
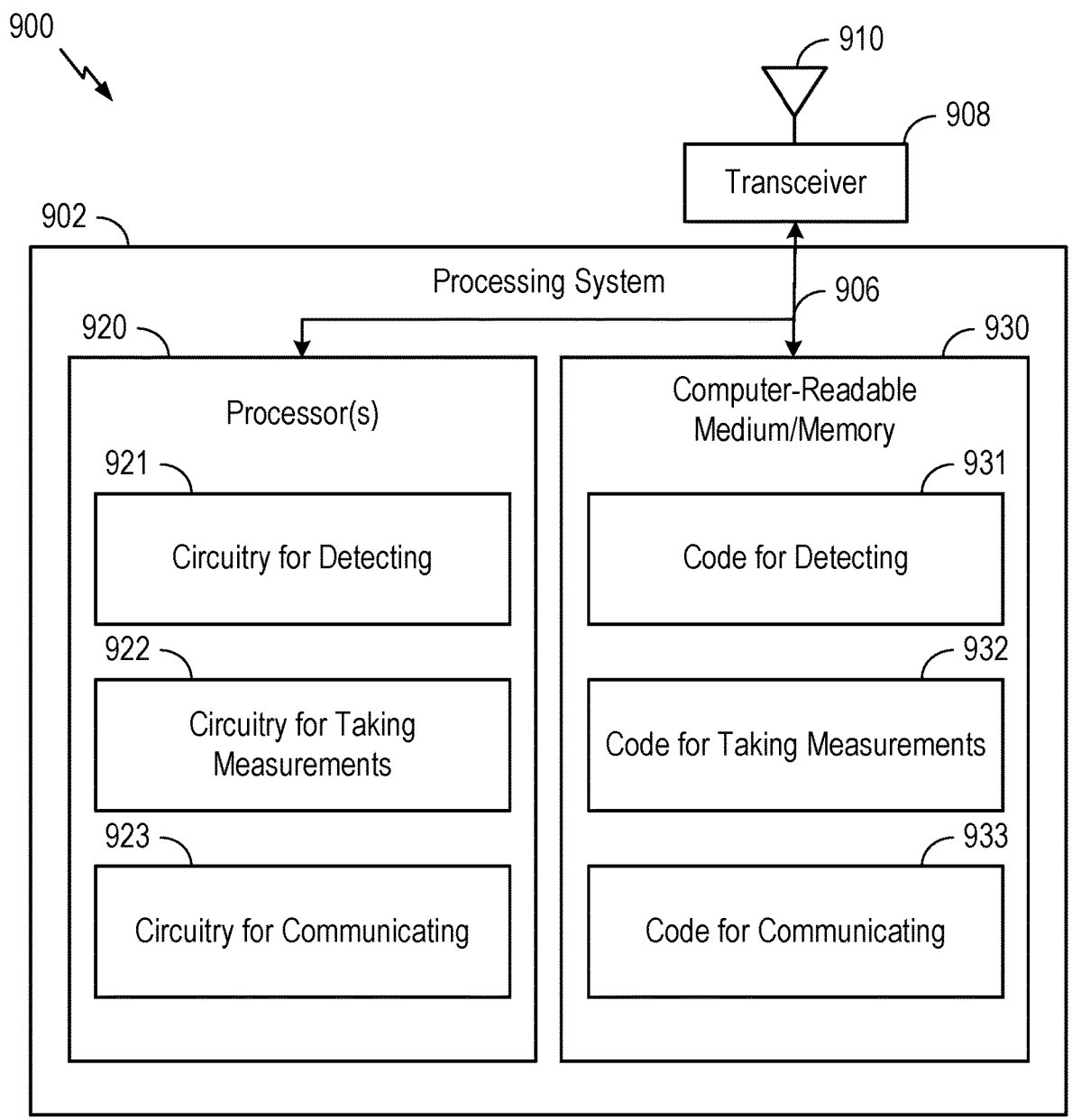
FIG. 9 depicts aspects of an example communications device.

FIG. 9 depicts an example communications device 900 that includes various components operable, configured, or adapted to perform operations for the techniques disclosed herein, such as the operations depicted and described with respect to FIGS. 6 and 8. In some examples, communication device 900 may be a base station 102 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 920 via a bus 906. In certain aspects, computer-readable medium/memory 920 is configured to store instructions (e.g., computer-executable code) that when executed by the one or more processors 920, cause the one or more processors 920 to perform the operations illustrated in FIGS. 6 and 8, or other operations for performing the various techniques discussed herein for configuring neighbor cell measurements.

In the depicted example, computer-readable medium/memory 930 stores code 931 for detecting, code 932 for taking measurements, and/or code 933 for communicating.

In the depicted example, the one or more processors 920 include circuitry configured to implement the code stored in the computer-readable medium/memory 920, including circuitry 921 for detecting, circuitry 922 for taking measurements, and/or circuitry 923 for communicating.

Various components of communications device 900 may provide means for performing the methods described herein, including with respect to FIGS. 6 and 8.

In some examples, means for transmitting or sending (or means for outputting for transmission or means for communicating) may include the transceivers 232 and/or antenna(s) 234 of the base station 102 illustrated in FIG. 2 and/or transceiver 908 and antenna 910 of the communication device 900 in FIG. 9.

In some examples, means for receiving (or means for obtaining or means for communicating) may include the transceivers 232 and/or antenna(s) 234 of the base station illustrated in FIG. 2 and/or transceiver 908 and antenna 910 of the communication device 900 in FIG. 9.

In some examples, means for taking measurements may include the transceivers 232 and/or antenna(s) 234 of the base station illustrated in FIG. 2 and/or transceiver 908 and antenna 910 of the communication device 900 in FIG. 9.

In some examples, means for detecting may include various processing system components, such as: the one or more processors 920 in FIG. 9, or aspects of the base station 102 depicted in FIG. 2, including receive processor 238, transmit processor 220, TX MIMO processor 230, and/or controller/processor 240 (including the neighbor cell measurement component 241).

Notably, FIG. 9 is just use example, and man9 other examples and configurations of communication device 900 are possible.

Figure 10:
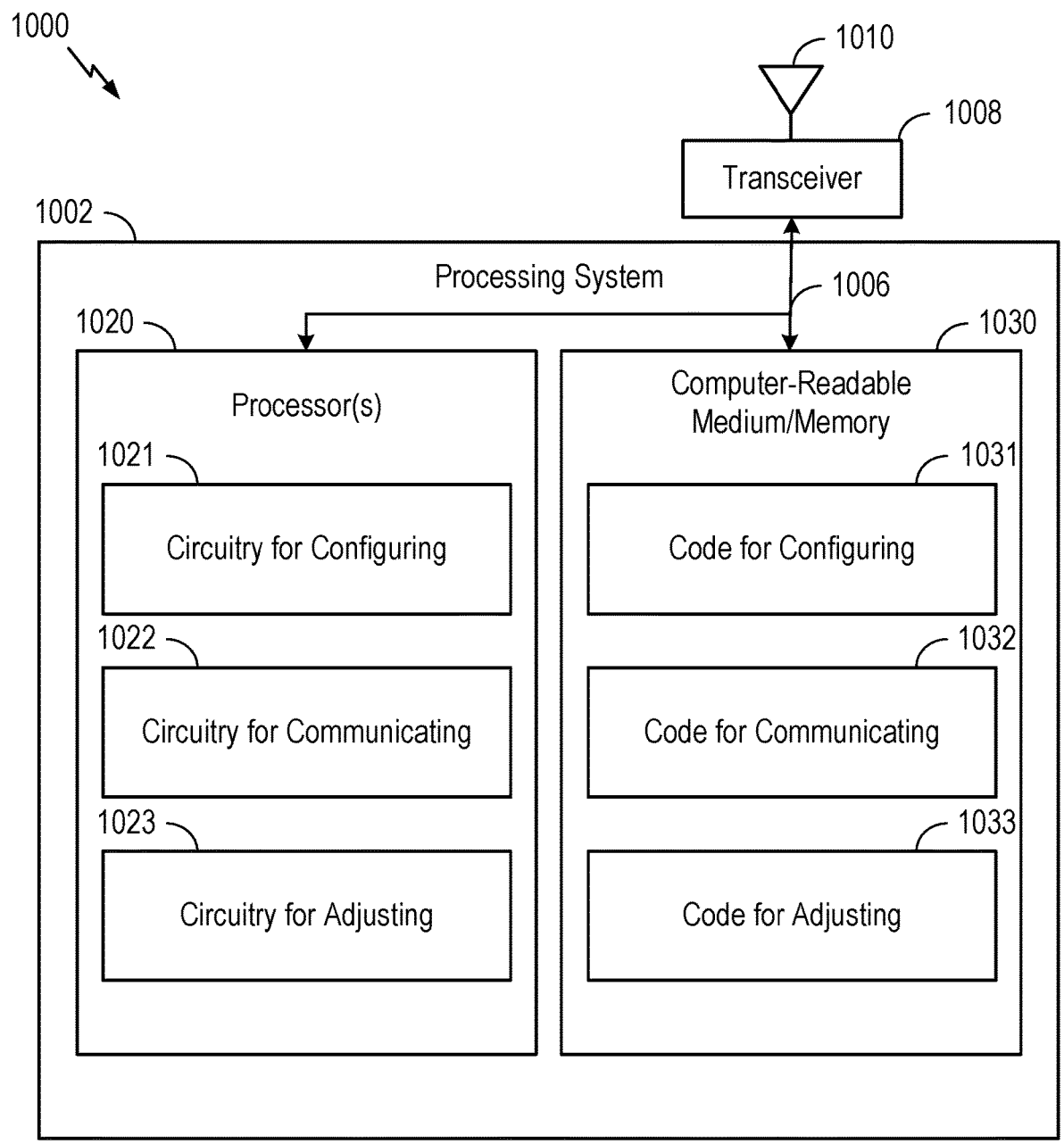
FIG. 10 depicts aspects of another example communications device.

FIG. 10 depicts an example communications device 1000 that includes various components operable, configured, or adapted to perform operations for the techniques disclosed herein, such as the operations depicted and described with respect to FIGS. 6 and 7. In some examples, communication device 1000 may be a user equipment 104 as described, for example with respect to FIGS. 1 and 2.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1020 via a bus 1006. In certain aspects, computer-readable medium/memory 1020 is configured to store instructions (e.g., computer-executable code) that when executed by the one or more processors 1020, cause the one or more processors 1020 to perform the operations illustrated in FIGS. 6 and 7, or other operations for performing the various techniques discussed herein for taking neighbor cell measurements.

In the depicted example, computer-readable medium/memory 1030 stores code 1031 for configuring, code 1032 for communicating, and/or code 1033 for adjusting.

In the depicted example, the one or more processors 1020 include circuitry configured to implement the code stored in the computer-readable medium/memory 1020, including circuitry 1021 for configuring, circuitry 1022 for communicating, and/or circuitry 1023 for adjusting.

Various components of communications device 1000 may provide means for performing the methods described herein, including with respect to FIGS. 6 and 7.

In some examples, means for transmitting or sending (or means for outputting for transmission or means for communicating) may include the transceivers 254 and/or antenna(s) 252 of the user equipment 104 illustrated in FIG. 2 and/or transceiver 1008 and antenna 1010 of the communication device 1000 in FIG. 10.

In some examples, means for receiving (or means for obtaining or means for communicating) may include the transceivers 254 and/or antenna(s) 252 of the user equipment 104 illustrated in FIG. 2 and/or transceiver 1008 and antenna 1010 of the communication device 1000 in FIG. 10.

In some examples, means for configuring and/or means for adjusting may include various processing system components, such as: the one or more processors 1020 in FIG. 10, or aspects of the user equipment 104 depicted in FIG. 2, including receive processor 258, transmit processor 264, TX MIMO processor 266, and/or controller/processor 280 (including the neighbor cell measurement component 281).

Notably, FIG. 10 is just use example, and many other examples and configurations of communication device 1000 are possible.

Example Clauses

Implementation examples are described in the following numbered clauses:

Clause 1. A method of wireless communication by a user equipment (UE), comprising: detecting a trigger to take neighbor cell measurements while the UE is in a radio resource control (RRC) connected state with a serving cell, based at least in part on a threshold applied to a channel condition metric measured for the serving cell and one or more additional conditions; and taking neighbor cell measurements in response to detecting the trigger.

Clause 2. The method of Clause 1, further comprising communicating with the serving cell via a narrowband carrier.

Clause 3. The method of any one of Clauses 1 or 2, wherein the UE comprises a narrowband (NB) Internet-of-Things (JOT) device.

Clause 4. The method of any one of Clauses 1-3, wherein the neighbor cell measurements include narrowband (NB) measurements.

Clause 5. The method of any one of Clauses 1-4, wherein: the channel condition metric comprises a receive level value associated with the serving cell; and detecting the trigger comprises detecting that the receive level value is less than or equal to the threshold and that the one or more additional conditions are met.

Clause 6. The method of any one of Clauses 1-5, wherein the one or more additional conditions comprise a first condition associated with an estimated volume of data for the UE to transmit or receive.

Clause 7. The method of Clause 6, wherein the first condition is considered met when a release assistance indication indicates additional data to be transmitted or received in the RRC connected state.

Clause 8. The method of any one of Clauses 6 or 7, wherein the first condition is considered met when a remaining amount of the data to be transmitted or received is greater than or equal to a first threshold.

Clause 9. The method of any one of Clauses 6-8, wherein the first condition is considered met when a remaining time for the data to be transmitted or received is greater than or equal to a second threshold.

Clause 10. The method of any one of Clauses 1-9, wherein the one or more additional conditions comprise a second condition associated with a channel condition between the UE and the serving cell.

Clause 11. The method of Clause 10, wherein the second condition is considered met when a rate of change in the channel condition is greater than or equal to a third threshold.

Clause 12. The method of any one of Clauses 1-11, wherein the neighbor cell measurements include at least one of intra-frequency neighbor cell measurements or inter-frequency neighbor cell measurements.

Clause 13. The method of Clause 12, wherein: the threshold includes a first threshold for intra-frequency neighbor cell measurements and a second threshold for inter-frequency neighbor cell measurements; and the one or more additional conditions include one or more third thresholds for intra-frequency neighbor cell measurements and one or more fourth thresholds for inter-frequency neighbor cell measurements.

Clause 14. The method of any one of Clauses 1-13, further comprising receiving a configuration indicating one or more thresholds for the one or more additional conditions.

Clause 15. A method of wireless communication by a network entity, comprising: configuring a UE with one or more thresholds for one or more additional conditions that trigger the UE to take neighbor cell measurements while the UE is in a radio resource control (RRC) connected state with the network entity based at least in part on a threshold applied to a channel condition metric measured for the network entity and the one or more additional conditions; and communicating with the UE via a narrowband carrier.

Clause 16. The method of Clause 15, wherein the UE comprises a narrowband (NB) Internet-of-Things (TOT) device.

Clause 17. The method of any one of Clauses 15 or 16, wherein the neighbor cell measurements include narrowband (NB) measurements.

Clause 18. The method of any one of Clauses 15-17, wherein the one or more thresholds comprise a first threshold associated with a remaining amount of data to be transmitted or received at the UE.

Clause 19. The method of any one of Clauses 15-18, wherein the one or more thresholds comprise a second threshold associated with a remaining time for data to be transmitted or received at the UE.

Clause 20. The method of any one of Clauses 15-19, wherein the one or more threshold comprise a third threshold associated with a rate of change in a channel condition between the UE and network entity.

Clause 21. The method of any one of Clauses 15-20, wherein the neighbor cell measurements include at least one of intra-frequency neighbor cell measurements or inter-frequency neighbor cell measurements.

Clause 22. The method of any one of Clauses 15-21, wherein: the threshold includes a first threshold for intra-frequency neighbor cell measurements and a second threshold for inter-frequency neighbor cell measurements; and the one or more thresholds include one or more third thresholds for intra-frequency neighbor cell measurements and one or more fourth thresholds for inter-frequency neighbor cell measurements.

Clause 23. The method of any one of Clauses 15-22, further comprising: adjusting the one or more thresholds based at least in part on the channel condition between the network entity and the UE; and configuring the UE with the adjusted one or more thresholds.

Clause 24. An apparatus for wireless communication, comprising: a memory; and a processor coupled to the memory, the processor and the memory being configured to detect a trigger to take neighbor cell measurements while the UE is in a radio resource control (RRC) connected state with a serving cell, based at least in part on a threshold applied to a channel condition metric measured for the serving cell and one or more additional conditions; and a transceiver configured to take neighbor cell measurements in response to detecting the trigger.

Clause 25. The apparatus of Clause 24, wherein the transceiver is configured to communicate with the serving cell via a narrowband carrier.

Clause 26. The apparatus of any one of Clauses 24 or 25, wherein: the channel condition metric comprises a receive level value associated with the serving cell; and the processor and the memory are further configured to detect that the receive level value is less than or equal to the threshold and that the one or more additional conditions are met.

Clause 27. The apparatus of any one of Clauses 24-26, wherein the one or more additional conditions comprise a first condition associated with an estimated volume of data for the UE to transmit or receive.

Clause 28. The apparatus of any one of Clauses 24-27, wherein the one or more additional conditions comprise a second condition associated with a channel condition between the UE and the serving cell.

Clause 29. A non-transitory computer-readable medium storing code that, when executed by one or more processors of an apparatus, cause the apparatus to perform a method, the method comprising: detecting a trigger to take neighbor cell measurements while the UE is in a radio resource control (RRC) connected state with a serving cell, based at least in part on a threshold applied to a channel condition metric measured for the serving cell and one or more additional conditions; and taking neighbor cell measurements in response to detecting the trigger.

Clause 30. The computer-readable medium of Clause 29, wherein the one or more additional conditions comprises at least one of a first condition associated with an estimated volume of data for the UE to transmit or receive or a second condition associated with a channel condition between the UE and the serving cell.

Clause 31: An apparatus, comprising: a memory comprising computer-executable instructions; one or more processors configured to execute the computer-executable instructions and cause the processing system to perform a method in accordance with any one of Clauses 1-23.

Clause 32: An apparatus, comprising means for performing a method in accordance with any one of Clauses 1-23.

Clause 33: A non-transitory computer-readable medium comprising computer-executable instructions that, when executed by one or more processors of a processing system, cause the processing system to perform a method in accordance with any one of Clauses 1-23.

Clause 34: A computer program product embodied on a computer-readable storage medium comprising code for performing a method in accordance with any one of Clauses 1-23.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a NodeB subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS or a home BS or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of triggering neighbor cell measurements in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method of wireless communication by a user equipment (UE), comprising:
   detecting a trigger to take neighbor cell measurements while the UE is in a radio resource control (RRC) connected state with a serving cell, based at least in part on a threshold applied to a channel condition metric measured for the serving cell and one or more additional conditions; and
   taking neighbor cell measurements in response to detecting the trigger,
   wherein the one or more additional conditions comprise a first condition associated with an estimated volume of data for the UE to transmit or receive, wherein the first condition is considered met when a release assistance indication indicates additional data to be transmitted or received in the RRC connected state.

2. The method of claim 1, further comprising communicating with the serving cell via a narrowband carrier.

3. The method of claim 1, wherein detecting the trigger comprises detecting that the one or more additional conditions are met.

4. The method of claim 1, wherein the neighbor cell measurements include narrowband (NB) measurements.

5. The method of claim 1, wherein:
   the channel condition metric comprises a receive level value associated with the serving cell; and
   detecting the trigger comprises detecting that the receive level value is less than or equal to the threshold and that the one or more additional conditions are met.

6. The method of claim 1, wherein the one or more additional conditions comprise a second condition associated with a channel condition between the UE and the serving cell.

7. The method of claim 6, wherein the second condition is considered met when a rate of change in the channel condition is greater than or equal to a second threshold, wherein detecting the trigger comprises detecting that the one or more additional conditions are met.

8. The method of claim 1, wherein the neighbor cell measurements include at least one of intra-frequency neighbor cell measurements or inter-frequency neighbor cell measurements.

9. The method of claim 8, wherein:
the threshold includes a first threshold for intra-frequency neighbor cell measurements and a second threshold for inter-frequency neighbor cell measurements; and
the one or more additional conditions include at least a third threshold for intra-frequency neighbor cell measurements and at least a fourth threshold for inter-frequency neighbor cell measurements.

10. The method of claim 1, further comprising receiving a configuration indicating one or more thresholds for the one or more additional conditions.

11. A method of wireless communication by a network entity, comprising:
configuring a user equipment (UE) to detect a trigger to take neighbor cell measurements while the UE is in a radio resource control (RRC) connected state with the network entity, based at least in part on a threshold applied to a channel condition metric measured for the network entity and one or more additional conditions,
wherein the one or more additional conditions comprise a first condition associated with an estimated volume of data for the UE to transmit or receive, wherein the first condition is considered met when a release assistance indication indicates additional data to be transmitted or received in the RRC connected state; and
communicating with the UE via a narrowband carrier.

12. The method of claim 11, wherein the one or more additional conditions comprise a second condition associated with a channel condition between the UE and the network entity, wherein the second condition is considered met when a rate of change in the channel condition is greater than or equal to a second threshold.

13. The method of claim 11, wherein the neighbor cell measurements include at least one of intra-frequency neighbor cell measurements or inter-frequency neighbor cell measurements.

14. The method of claim 11, wherein:
the threshold includes a first threshold for intra-frequency neighbor cell measurements and a second threshold for inter-frequency neighbor cell measurements; and
the one or more additional conditions include at least a third threshold for intra-frequency neighbor cell measurements and at least a fourth threshold or inter-frequency neighbor cell measurements.

15. The method of claim 11, further comprising:
adjusting the one or more conditions based at least in part on a channel condition between the network entity and the UE; and
configuring the UE with the adjusted one or more conditions.

16. An apparatus for wireless communication at a user equipment (UE), comprising one or more processors configured to execute processor-executable instructions stored in memory and cause the UE to:
detect a trigger to take neighbor cell measurements while the UE is in a radio resource control (RRC) connected state with a serving cell, based at least in part on a threshold applied to a channel condition metric measured for the serving cell and one or more additional conditions; and
take neighbor cell measurements in response to detection of the trigger,
wherein the one or more additional conditions comprise a first condition associated with an estimated volume of data for the UE to transmit or receive, wherein the first condition is considered met when a release assistance indication indicates additional data to be transmitted or received in the RRC connected state.

17. The apparatus of claim 16, wherein the one or more processors are configured to execute the processor-executable instructions and cause the UE to communicate with the serving cell via a narrowband carrier.

18. The apparatus of claim 16, wherein the one or more processors, to detect the trigger, are configured to execute the processor-executable instructions and cause the UE to detect that the one or more additional conditions are met.

19. The apparatus of claim 16, wherein the neighbor cell measurements include narrowband (NB) measurements.

20. The apparatus of claim 16, wherein:
the channel condition metric comprises a receive level value associated with the serving cell; and
the one or more processors, to detect the trigger, are configured to execute the processor-executable instructions and cause the UE to detect that the receive level value is less than or equal to the threshold and that the one or more additional conditions are met.

21. The apparatus of claim 16, wherein the one or more additional conditions comprise a second condition associated with a channel condition between the UE and the serving cell.

22. The apparatus of claim 21, wherein the second condition is considered met when a rate of change in the channel condition is greater than or equal to a second threshold, wherein the one or more processors, to detect the trigger, are configured to execute the processor-executable instructions and cause the UE to detect that the one or more additional conditions are met.

23. The apparatus of claim 16, wherein the neighbor cell measurements include at least one of intra-frequency neighbor cell measurements or inter-frequency neighbor cell measurements.

24. The apparatus of claim 23, wherein:
the threshold includes a first threshold for intra-frequency neighbor cell measurements and a second threshold for inter-frequency neighbor cell measurements; and
the one or more additional conditions include at least a third threshold for intra-frequency neighbor cell measurements and at least a fourth threshold for inter-frequency neighbor cell measurements.

25. The apparatus of claim 16, wherein the one or more processors are configured to execute the processor-executable instructions and cause the UE to receive a configuration indicating one or more thresholds for the one or more additional conditions.

26. An apparatus for wireless communication at a network entity, comprising one or more processors configured to execute processor-executable instructions stored in memory and cause the network entity to:
configure a user equipment (UE) to detect a to take neighbor cell measurements while the UE is in a radio resource control (RRC) connected state with the network entity, based at least in part on a threshold applied to a channel condition metric measured for the network entity and one or more additional conditions,
wherein the one or more additional conditions comprise a first condition associated with an estimated volume of data for the UE to transmit or receive, wherein the first condition is considered met when a release assistance indication indicates additional data to be transmitted or received in the RRC connected state; and communicate with the UE via a narrowband carrier.

27. The apparatus of claim 26, wherein the one or more additional conditions comprise a second condition associated with a channel condition between the UE and the network entity, wherein the second condition is considered met when a rate of change in the channel condition is greater than or equal to a second threshold.

28. The apparatus of claim 26, wherein the neighbor cell measurements include at least one of intra-frequency neighbor cell measurements or inter-frequency neighbor cell measurements.

29. The apparatus of claim 26, wherein:
the threshold includes a first threshold for intra-frequency neighbor cell measurements and a second threshold for inter-frequency neighbor cell measurements; and
the one or more additional conditions include at least a third threshold for intra-frequency neighbor cell measurements and at least a fourth threshold or inter-frequency neighbor cell measurements.

30. The apparatus of claim 26, wherein the one or more processors are configured to execute the processor-executable instructions and cause the network entity to:
adjust the one or more conditions based at least in part on a channel condition between the network entity and the UE; and
configure the UE with the adjusted one or more conditions.

* * * * *